US012630251B2

(12) United States Patent
Yang et al.

(10) Patent No.: US 12,630,251 B2
(45) Date of Patent: May 19, 2026

(54) KICK SCOOTER HAVING DETACHABLE STEERING MECHANISM

(71) Applicant: SHENZHEN BAIKE NEW ENERGY CO., LTD., Shenzhen City (CN)

(72) Inventors: Zhen Yang, Shenzhen City (CN); Zhenshan Ding, Shenzhen City (CN); Ke Li, Shenzhen City (CN)

(73) Assignee: SHENZHEN BAIKE NEW ENERGY CO., LTD., Shenzhen City (CN)

( * ) Notice: Subject to any disclaimer, the term of this patent is extended or adjusted under 35 U.S.C. 154(b) by 325 days.

(21) Appl. No.: 18/603,222

(22) Filed: Mar. 13, 2024

(65) Prior Publication Data

US 2025/0153797 A1 May 15, 2025

(30) Foreign Application Priority Data

Nov. 13, 2023 (CN) .......................... 202323063097.4

(51) Int. Cl.
B62K 3/00 (2006.01)

(52) U.S. Cl.
CPC .................................... B62K 3/002 (2013.01)

(58) Field of Classification Search
CPC . B60K 3/002; B60K 15/006; B60K 2015/001
See application file for complete search history.

(56) References Cited

U.S. PATENT DOCUMENTS

| | | | | |
|---|---|---|---|---|
| 8,864,152 B1 * | 10/2014 | Danze | .................... | B62K 3/002 |
| | | | | 280/87.041 |
| 9,010,776 B2 * | 4/2015 | Elliott | .................... | B62K 3/002 |
| | | | | 280/87.041 |
| 9,446,811 B1 * | 9/2016 | Abel | ...................... | B62K 3/002 |
| 11,541,958 B2 * | 1/2023 | Burkholder | .............. | B62J 11/19 |
| 2014/0061267 A1 * | 3/2014 | Turner | .................. | B62K 3/002 |
| | | | | 224/413 |

(Continued)

FOREIGN PATENT DOCUMENTS

| | | | | | |
|---|---|---|---|---|---|
| CN | 110126952 A | * | 8/2019 | ............. | B62K 3/002 |
| FR | 2998537 A1 | * | 5/2014 | ............. | B62K 15/00 |
| TW | 201217213 A | * | 5/2012 | ............. | B62M 1/38 |

*Primary Examiner* — Katy M Ebner

(74) *Attorney, Agent, or Firm* — Li & Cai Intellectual Property Office

(57) ABSTRACT

A kick scooter having a detachable steering mechanism is provided. A detachable mounting seat is provided on an outer peripheral wall of a vertical rod of the kick scooter, and includes a left housing and a right housing. The left housing is inserted into a mounting through hole through an internally-threaded column, and the right housing is mounted on the vertical rod. A countersunk screw is inserted into the internally-threaded column from the first countersunk through hole, and is screwed to be threadedly connected to the internally-threaded column. The engagement structure is engaged to the rotating connection member. When disassembling, the countersunk screw is unscrewed from the internally-threaded column and the left and right housings are removed from the vertical rod. The engagement mechanism releases the engagement of the rotating connection member, and the vertical rod and pedal are separated and stored or transported as two parts.

10 Claims, 6 Drawing Sheets

(56) References Cited

U.S. PATENT DOCUMENTS

| | | | | |
|---|---|---|---|---|
| 2014/0159330 A1* | 6/2014 | Elliott | .................... | B62K 19/14 |
| | | | | 280/87.041 |
| 2017/0101153 A1* | 4/2017 | Eckert | .................... | B62K 13/08 |
| 2018/0290046 A1* | 10/2018 | Quaglia | ................. | B62K 21/12 |
| 2020/0361561 A1* | 11/2020 | Burkholder | ............ | B62K 21/12 |
| 2022/0371680 A1* | 11/2022 | Jodha | .................... | B62K 3/002 |

* cited by examiner

KICK SCOOTER HAVING DETACHABLE STEERING MECHANISM

FIELD OF THE DISCLOSURE

The present disclosure relates to the technical field of kick scooters, and more particularly to a kick scooter having a detachable steering mechanism.

BACKGROUND OF THE DISCLOSURE

Kick scooters are popular in Japan and Southeast Asia because they are easy to learn how to use, the user only takes one minute to learn and can perform some tricks in ten minutes. Therefore, kick scooters have been all the rage on the market. "Kick scooters" are very light and generally weigh less than 3 kg, and can be folded when stored and unfolded or folded in 30 seconds.

Since the kick scooter has a moderate speed and a braking device, it is easy to learn and operate. The user generally doesn't fall easily if the kick scooter is just for daily transportation and entertainment. Therefore, the kick scooter is suitable for use by many age groups, especially teenagers who can't put it down and are proud to own a vehicle. Kick scooters have a good exercise effect on the developing and perfect balance system of teenagers.

When a merchant needs to mail the kick scooter to the buyer, the vertical rod and the pedal occupy a large space when combined together, which is inconvenient for transportation and causes inconvenience to the user when carrying the kick scooter or storing the kick scooter board when going out.

SUMMARY OF THE DISCLOSURE

The technical problem to be solved by the present disclosure is that when the merchant needs to deliver the kick scooter to a user, the vertical rod and the pedal occupy a large space when combined together, which is inconvenient for transportation and causes inconvenience to the user when carrying the kick scooter or storing the kick scooter board when going out. In view of the above-mentioned defects of the prior art, a kick scooter having a detachable steering mechanism is provided.

In order to achieve the above objects, the technical solution adopted by the present disclosure is as follows.

A kick scooter having a detachable steering mechanism is provided, which includes a pedal and a vertical rod. A detachable mounting seat is provided on an outer peripheral wall of the vertical rod, a rotating seat is provided at one end of the pedal adjacent to the vertical rod and rotatably connected to a rotating connection member, an engagement structure for being engaged to the rotating connection member is provided at one end of the detachable mounting seat adjacent to the pedal. The detachable mounting seat includes a left housing and a right housing, an internally-threaded column is provided on an inner wall of the left housing, a mounting through hole configured for the internally-threaded column to pass through is provided on the vertical rod, and a first countersunk through hole is provided on a top of the right housing.

Preferably, a support fork connected to a front wheel is provided on a bottom of the vertical rod, the detachable mounting seat is provided on a top of the support fork, and a support ring is provided on a bottom of the detachable mounting seat.

Preferably, an externally-threaded hollow rod is provided on a top of the detachable mounting seat, and the externally-threaded hollow rod includes a left rod provided on a top of the left housing and a right rod provided on a top of the right housing.

Preferably, a positioning column is provided at one end of the first countersunk through hole adjacent to the left housing, and a positioning hole through which the internally-threaded column is inserted and positioned is provided on the positioning column.

Preferably, a first reinforcing rib is provided on the inner wall of the left housing, the first reinforcing rib is integrally formed with the internally-threaded column, a second reinforcing rib is provided on an inner wall of the right housing, and the second reinforcing rib is integrally formed with the positioning hole.

Preferably, the rotating connection member includes a steering seat and the steering seat includes a steering seat main body, and a first fixed piece provided on a top of the steering seat main body. A second fixed piece is provided on a bottom of the steering seat main body, and a rotation shaft is provided between the first fixed piece and the second fixed piece.

Preferably, the engagement structure has a first mounting groove, an upper mounting block and a lower mounting block are respectively provided on a top and a bottom of the first mounting groove, a second mounting groove is provided on a bottom of the upper mounting block, a third mounting groove is provided on a top of the lower mounting block, the steering seat main body is provided in the first mounting groove, the first fixed piece is provided in the second mounting groove, and the second fixed piece is provided in the third mounting groove.

Preferably, an assembly through hole that passes through a top and a bottom of the rotating seat is provided on a middle part of the rotating seat, a bearing is provided in the assembly through hole, and the rotation shaft passes through the assembly through hole and is rotatably connected to the bearing.

Preferably, a second countersunk through hole directly facing a top of the assembly through hole is provided on the upper mounting block, a third countersunk through hole directly facing a bottom of the assembly through hole is provided on the lower mounting block, a threaded through hole that passes through a top and a bottom of the rotation shaft is provided on the rotation shaft, an externally-threaded fixed countersunk column is threadedly connected to the threaded through hole, a length of the externally-threaded fixed countersunk column is greater than a depth of the threaded through hole, and a nut adapted to the externally-threaded fixed countersunk column is provided in the third countersunk through hole.

Preferably, an arc-shaped positioning groove is correspondingly provided on one end of the first reinforcing rib adjacent to the vertical rod and one end of the second reinforcing rib adjacent to the vertical rod.

The beneficial effects of the present disclosure are that the detachable mounting seat is provided on the outer peripheral wall of the vertical rod of the kick scooter, and the detachable mounting seat includes the left housing and the right housing. The left housing is inserted into the mounting through hole through the internally-threaded column, and then the right housing is mounted on the vertical rod. The countersunk screw is inserted into the internally-threaded column from the first countersunk through hole, and then the countersunk screw is screwed to be threadedly connected to the internally-threaded column, so that the detachable mounting seat is mounted on the vertical rod. At this time, the engagement structure is engaged to the rotating connection member. When disassembling, the countersunk screw is unscrewed from the internally-threaded column to be removed and then the left and right housings are removed from the vertical rod. At this time, the clamping mechanism releases the clamping of the rotating connection member, and the vertical rod and the pedal can be separated and stored or transported as two parts.

BRIEF DESCRIPTION OF THE DRAWINGS

In order to explain the embodiments of the present disclosure or the technical solutions in the prior art more clearly, the drawings needed to be used in the description of the embodiments or the prior art will be briefly introduced below. Obviously, the drawings in the following description are only some embodiments of the present disclosure. For those of ordinary skill in the art, other drawings can be obtained based on these drawings without exerting any creative effort.

Figure 1:
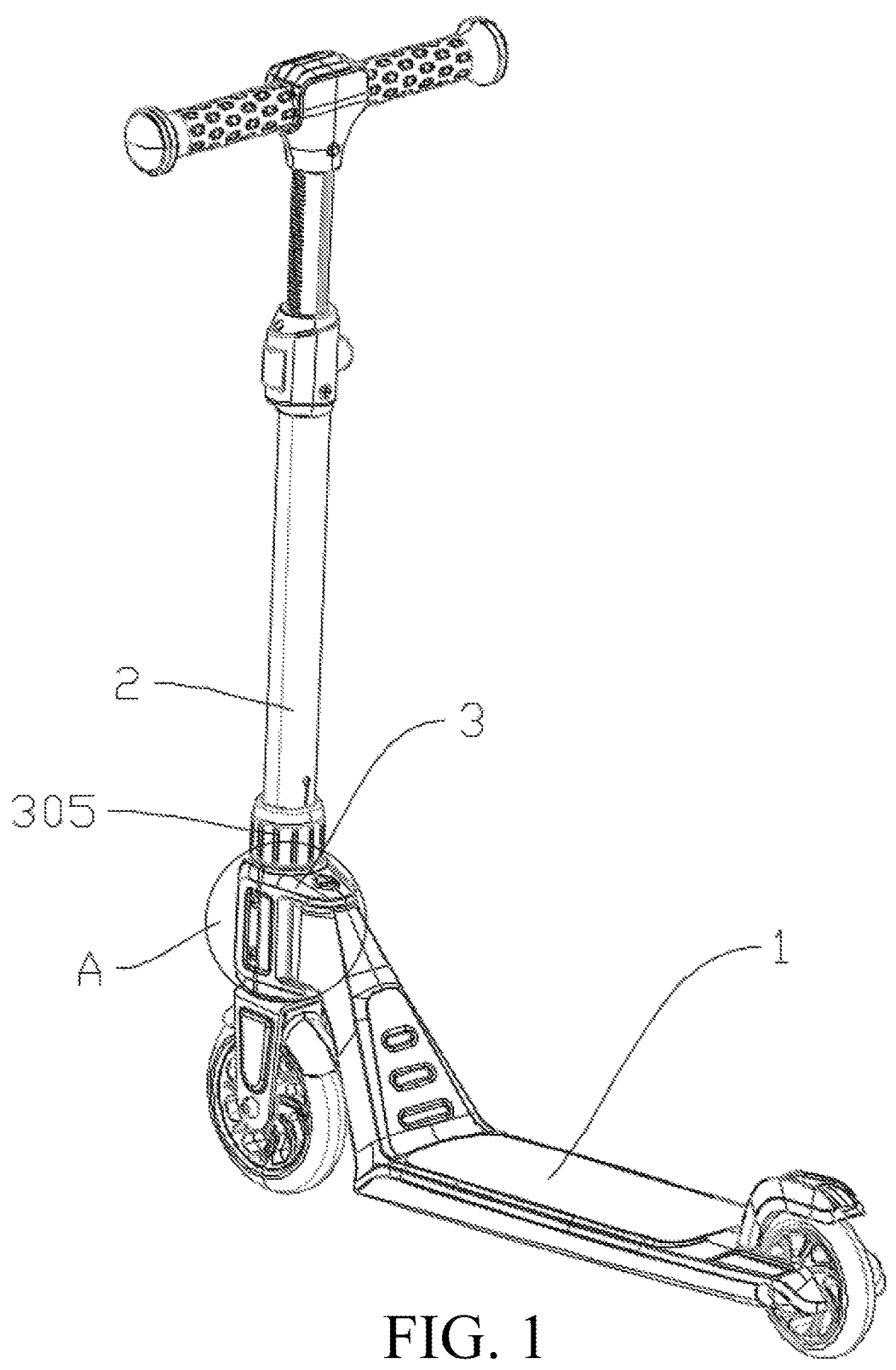
FIG. 1 is a schematic diagram of an overall bearing according to the present disclosure.

Reference numeral: 1, pedal; 2, vertical rod; 201, mounting through hole; 3, detachable mounting seat; 301, left housing; 302, right housing; 311, internally-threaded column; 312, first countersunk through hole; 303, support ring; 304, externally-threaded hollow rod; 314, left rod; 324, right rod; 305, internally-threaded connecting ring; 306, groove; 307, block; 308, positioning column; 318, positioning hole; 321, first reinforcing rib; 322, second reinforcing rib; 331, first vertical reinforcing rib; 341, first transverse reinforcing rib; 332, second vertical reinforcing rib; 342, second transverse reinforcing rib; 4, rotating seat; 401, assembly through hole; 511, steering seat main body; 521, first fixed piece; 531, second fixed piece; 541, rotation shaft; 601, first mounting groove; 602, upper mounting block; 603, lower mounting block; 605, third mounting groove; 612, second countersunk through hole; 613, third countersunk through hole; 7, front wheel; 8, support fork; 10, externally-threaded fixed countersunk column; and 12, arc-shaped positioning groove.

DETAILED DESCRIPTION OF THE EXEMPLARY EMBODIMENTS

In order to make the purpose, technical solutions and advantages of the present disclosure clearer, the technical solutions in the present disclosure will be clearly and completely described below in conjunction with the drawings in the present disclosure. Obviously, the described embodiments are some, but not all, of the embodiments of the present disclosure. Based on the embodiments of the present disclosure, all other embodiments obtained by those of ordinary skill in the art without making creative efforts fall within the scope of protection of the present disclosure.

In the description of the embodiments of the present disclosure, it should be noted that, unless otherwise clearly stated and limited, the terms "connected" and "connecting" should be understood in a broad sense. For example, it can be a fixed connection or a detachable connection, or integrated connection; it can be a mechanical connection or an electrical connection; it can be a direct connection or an indirect connection through an intermediate medium. For those of ordinary skill in the art, the specific meanings of the above terms in the embodiments of the present disclosure can be understood in specific situations.

In the embodiments of the present disclosure, unless otherwise expressly provided and limited, the first feature being "on" or "below" the second feature may be the first and second features being in direct contact, or the first and second features being in indirect contact through an intermediary. Furthermore, the first feature is "above", "on" and "upon" the second feature is above the second feature may mean that the first feature is directly above or diagonally above the second feature, or simply means that the first feature is higher in level than the second feature. The first feature is "below", "under" and "beneath" the second feature may mean that the first feature is directly below or diagonally below the second feature, or simply means that the first feature has a smaller horizontal height than the second feature.

In the description of this specification, reference to the terms "one embodiment," "some embodiments," "an example," "specific examples," or "some examples" or the like means that specific features are described in connection with the embodiment or example, structures, materials or features are included in at least one embodiment or example of the embodiments of the present disclosure. In this specification, the schematic expressions of the above terms are not necessarily directed to the same embodiment or example. Furthermore, the specific features, structures, materials or characteristics described may be combined in any suitable manner in any one or more embodiments or examples. Furthermore, those skilled in the art may combine and combine different embodiments or examples and features of different embodiments or examples described in this specification unless they are inconsistent with each other.

Figure 2:
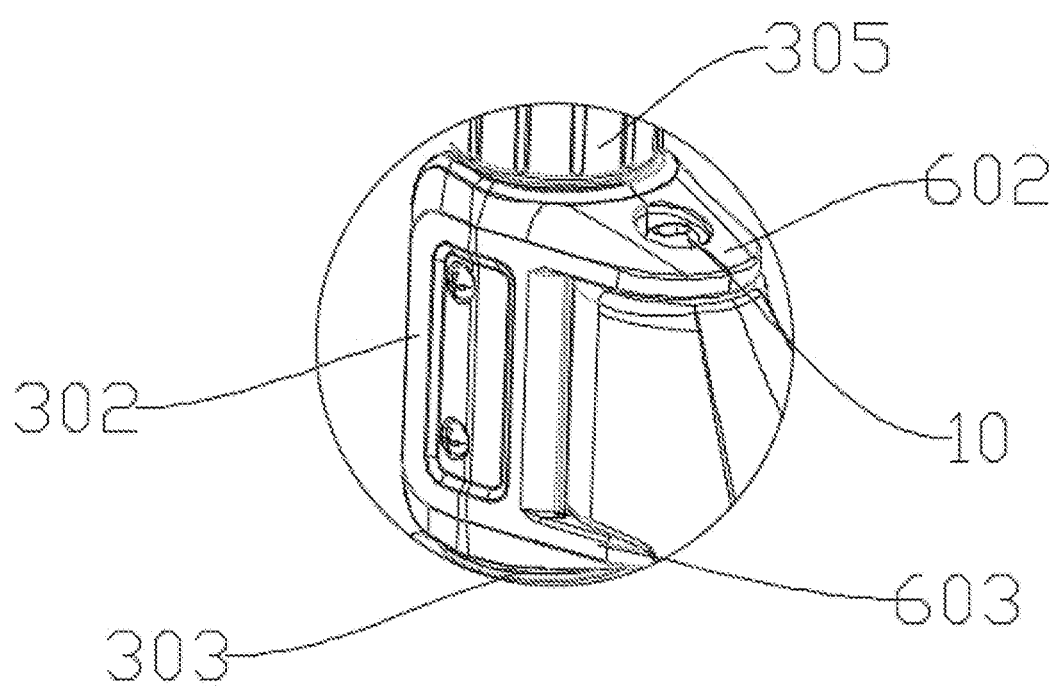
FIG. 2 is a schematic enlarged diagram of part A in FIG. 1 according to the present disclosure.
Figure 3:
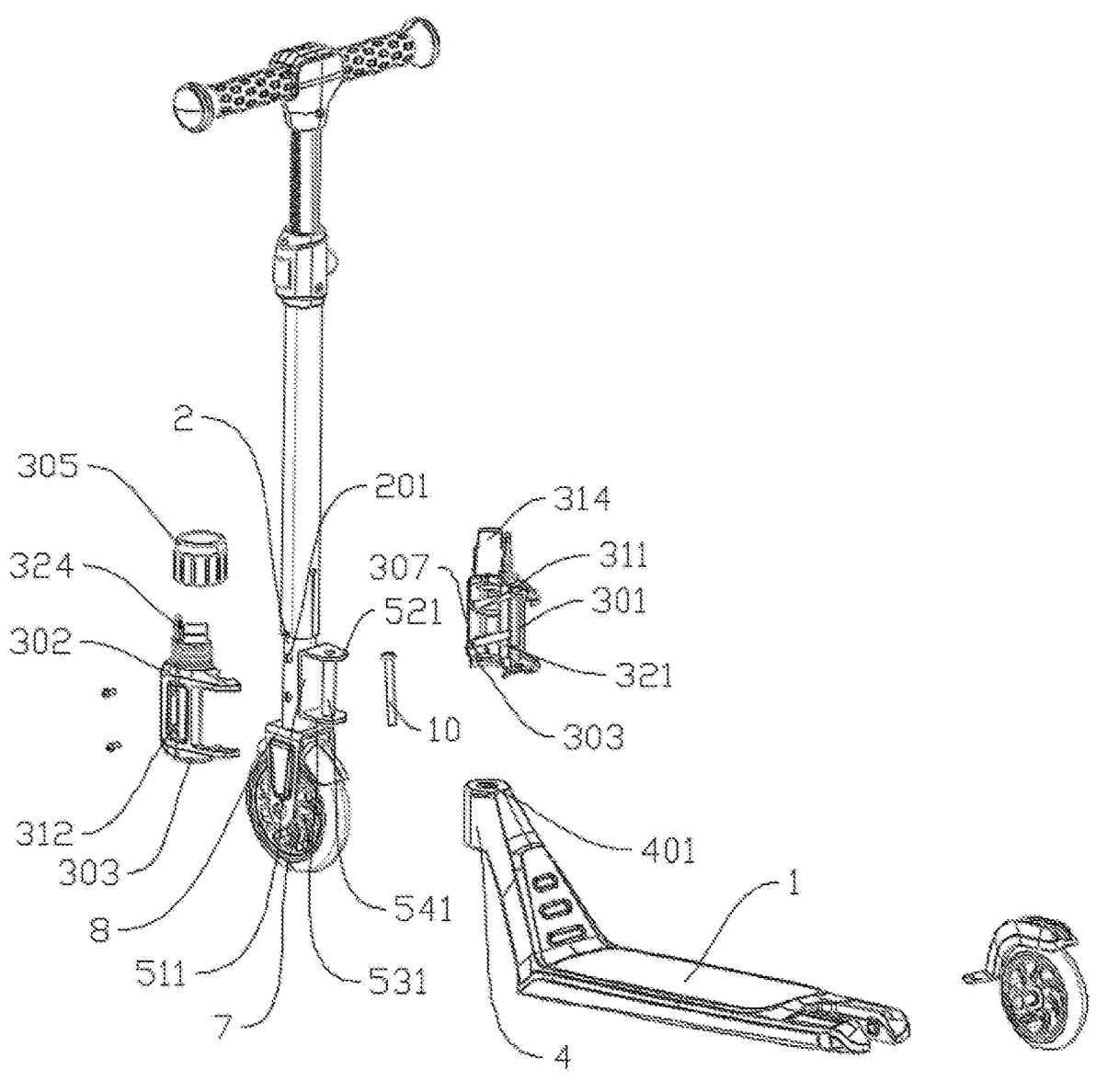
FIG. 3 is an overall exploded diagram according to the present disclosure.
Figure 4:
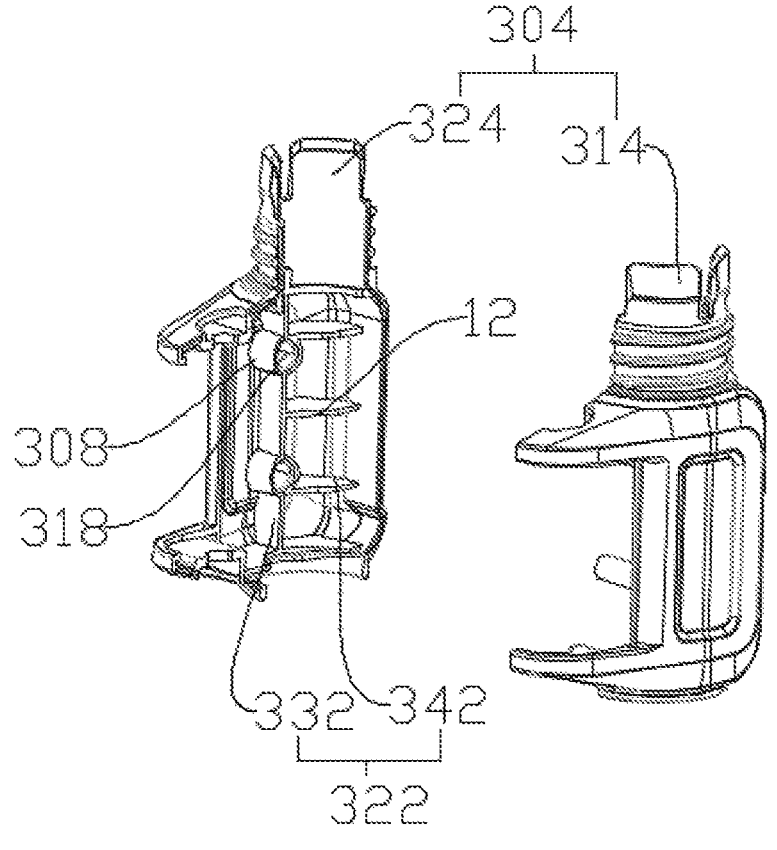
FIG. 4 is a schematic exploded diagram of a detachable mounting seat according to the present disclosure.
Figure 5:
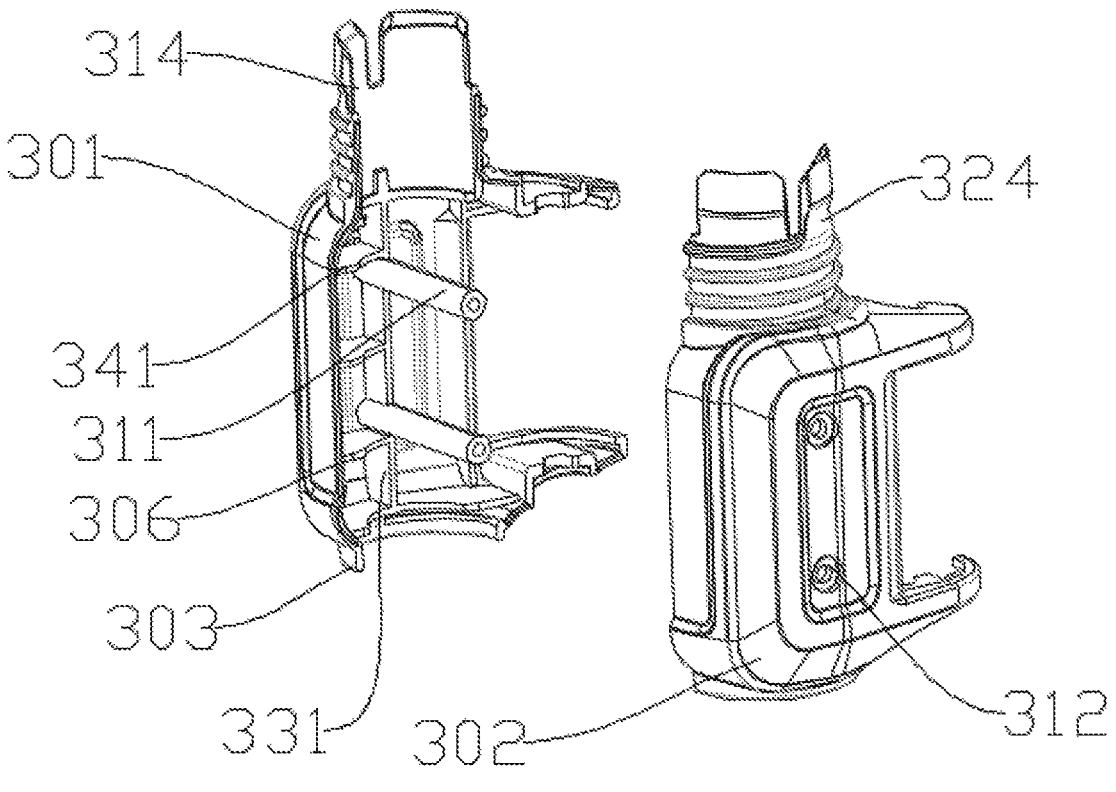
FIG. 5 is another schematic exploded diagram of the detachable mounting seat according to the present disclosure.
Figure 6:
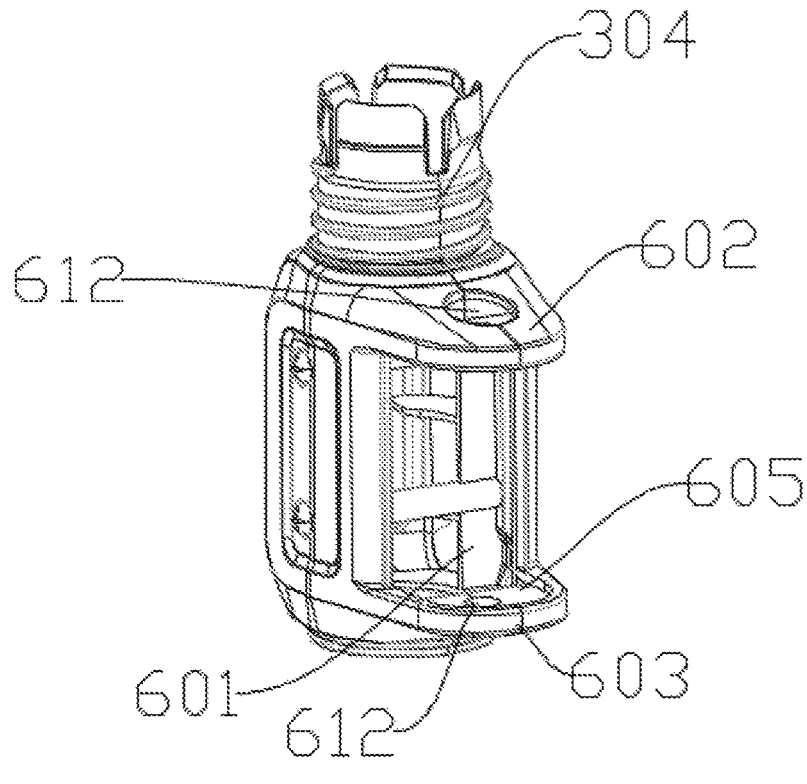
FIG. 6 is an overall isometric view of the detachable mounting seat according to the present disclosure.

The embodiment of the present disclosure is shown in FIGS. 1 to 6, in which a pedal 1 and a vertical rod 2 are provided. An outer peripheral wall of the vertical rod 2 is provided with a detachable mounting seat 3. One end of the pedal 1 adjacent to the vertical rod 2 is provided with a rotating seat 4. The rotating seat 4 is rotatably connected to a rotating connection member. One end of the detachable mounting seat 3 adjacent to the pedal 1 is provided with an engagement structure for being engaged to the rotating connection member. The detachable mounting seat 3 includes a left housing 301 and a right housing 302. An inner wall of the housing 301 is provided with an internally-threaded column 311. The vertical rod 2 is provided with a mounting through hole 201 through which the internally-threaded column 311 passes. The right housing 302 is provided with a first countersunk through hole 312. When the vertical rod 2 and the pedal 1 are needed to rotatably connected to each other, the left housing 301 and the right housing 302 can be placed on the outer peripheral wall of the vertical rod 2. At this time, the internally-threaded column 311 is inserted into the mounting through hole 201 and the countersunk screw passes through the first countersunk through hole 312 and is threaded with the internally-threaded column 311, and the engagement structure is engaged to the rotating connection member, so that the left housing 301 and the right housing 302 are both fixedly connected to the vertical rod 2. In the present embodiment, two mounting through holes 201 respectively corresponding to the internally-threaded column 311, the first countersunk through hole 312, and the countersunk screw are provided.

Further, a bottom of the vertical rod 2 is provided with a support fork 8 connected to a front wheel 7. The detachable mounting seat 3 is provided on a top of the support fork 8. A bottom of the detachable mounting seat 3 is provided with the support ring 303. When the detachable mounting seat 3 is mounted to the vertical rod 2, the support ring 303 provided on the bottom of the detachable mounting seat 3 is in contact with the top of the support fork 8 for supporting the detachable mounting seat 3.

In addition, the top of the detachable mounting seat 3 is provided with an externally-threaded hollow rod 304. The externally-threaded hollow rod 304 includes a left rod 314 provided on a top of the left housing 301 and a right rod 324 provided on a top of the right housing 302. When the left housing 301 and the right housing 302 are both connected to the vertical rod 2, the left rod 314 and the right rod 324 are combined to form the externally-threaded hollow rod 304. At this time, an internally-threaded connecting ring 305 can be sleeved on the externally-threaded hollow rod 304 to be threadedly connected to the externally-threaded hollow rod 304 so as to increase a fixing strength of the left housing 301 and the right housing 302 to the vertical rod 2. In the present embodiment, a groove 306 is provided on a side of the left housing 301 adjacent to the right housing 306, and a block 307 that matches the groove 306 is provided on the side of the right housing 302 adjacent to the left housing 301. A cooperation between the groove 306 and the block 307 can make the left housing 301 and the right housing 302 accurately match each other.

Furthermore, a positioning column 308 is provided at one end of the first countersunk through hole 312 adjacent to the left housing 301. The positioning column 308 is provided with a positioning hole 318 through which the internally-threaded column 311 is inserted and positioned. The presence of the positioning hole 318 can enable the internally-threaded column 311 to be accurately inserted and positioned into the left housing 301 to facilitate the thread connection between the countersunk screw and the internally-threaded column 311, and the insertion of the internal thread into the positioning hole 318 can enhance a connection strength between the left housing 301 and the right housing 302.

Referring to FIGS. 3 to 6, in the present embodiment, a first reinforcing rib 321 is provided on an inner wall of the left housing 301, and the first reinforcing rib 321 is integrally formed with the internally-threaded column 311. A second reinforcing rib 321 is provided on an inner wall of the right housing 302, and the second reinforcing rib 322 is integrally formed with the positioning hole 318. Further, the first reinforcing rib 321 includes a first vertical reinforcing rib 331 and a first transverse reinforcing rib 341. Multiple first transverse reinforcing ribs 341 can be provided. In the present embodiment, three first transverse reinforcing ribs 341 are provided, and the three first transverse reinforcing ribs 341 are correspondingly and vertically connected to the first vertical reinforcing rib 331, in which the first vertical reinforcing rib 331 is integrally formed with the internally-threaded column 311. The second reinforcing rib 322 includes a second vertical reinforcing rib 332 and a second transverse reinforcing rib 342. Multiple second transverse reinforcing ribs 342 can be provided. In the present embodiment, three second transverse reinforcing ribs 342 are provided, and the three second transverse reinforcing ribs 342 are correspondingly and vertically connected to the second vertical reinforcing rib 332, in which the positioning column 308 is provided at a location where the second transverse reinforcing rib 342 and the second vertical reinforcing rib 332 are connected to each other, and is integrally formed with the second transverse reinforcing rib 342 and the second vertical reinforcing rib 332.

Referring to FIGS. 1-6, in the present embodiment, the rotating connection member includes a steering seat. The steering seat includes a steering seat main body 511 and a first fixed piece 521 provided on a top of the steering seat main body 511. A bottom of the steering seat main body 511 is provided with a second fixed piece 531. A rotation shaft 541 is provided between the first fixed piece 521 and the second fixed piece 531.

In the present embodiment, the engagement structure includes the first mounting groove 601. A top and a bottom of the first mounting groove 601 are respectively provided with an upper mounting block 602 and a lower mounting block 603. A second mounting groove is provided on a bottom of the upper mounting block 602, a third mounting groove 605 is provided on a top of the lower mounting block 603, the steering seat main body 511 is provided in the first mounting groove 601, the first fixed piece 521 is provided in the second mounting groove, and the second fixed piece 531 is provided in the third mounting groove 605.

Furthermore, a middle part of the rotating seat 4 is provided with an assembly through hole 401 that passes through a top and a bottom of the rotating seat 4. A bearing is provided in the assembly through hole 401, and the rotation shaft 541 is inserted into the assembly through hole 401 and rotatably connected to the bearing.

Referring to FIGS. 3 to 6, in the present embodiment, the upper mounting block 602 is provided with a second countersunk through hole 612 directly facing a top of the assembly through hole 401, and the lower mounting block 603 is provided with a third countersunk through hole 613 directly facing a bottom of the assembly through hole 401. The rotation shaft 541 is provided with a threaded through hole that passes through a top and a bottom of the rotation shaft 541. A thread in the threaded through hole is threaded with the externally-threaded fixed countersunk column 10, a length of the externally-threaded fixed countersunk column 10 is greater than a depth of the threaded through hole, and a nut adapted to the externally-threaded fixed countersunk column 10 is provided in the third countersunk through hole 613. During assembly, the externally-threaded fixed countersunk column 10 can be screwed to the threaded through hole on the rotation shaft 541, and when the externally-threaded fixed countersunk column 10 is screwed to a certain depth of the threaded through hole, a bottom of the externally-threaded fixed countersunk column 10 is exposed from the bottom of the threaded through hole. At this time, the nut can be placed in the third countersunk through holes 613 and is threadedly connected to the bottom of the externally-threaded fixed countersunk column 10, and the detachable mounting seat 3 is connected to the rotating column. In the present embodiment, the upper mounting block 602 and one half of the second countersunk through hole 612 are located on the left housing 301 and another half of the second countersunk through hole 612 is located on the right housing 302. The lower mounting block 603 and one half of the third countersunk through hole 613 are located on the left housing 301 and another half of the third countersunk through hole 613 is located on the right housing 302.

Further, an arc-shaped positioning groove 12 is correspondingly provided at one end of the first reinforcing rib 321 adjacent to the vertical rod 2 and one end of the second reinforcing rib 322 adjacent to the vertical rod 2. During assembly, the arc-shaped positioning groove 12 can facilitate the positioning of the left housing 301 and the right housing 302 and the vertical rod 2.

It should be understood that those skilled in the art can make improvements or changes based on the above description, and all these improvements and changes should fall within the protection scope of the appended claims of the present disclosure.

What is claimed is:

1. A kick scooter having a detachable steering mechanism, comprising: a pedal (1) and a vertical rod (2), wherein a detachable mounting seat (3) is provided on an outer peripheral wall of the vertical rod (2), a rotating seat (4) is provided at one end of the pedal (1) adjacent to the vertical rod (2) and rotatably connected to a rotating connection member, an engagement structure for being engaged to the rotating connection member is provided at one end of the detachable mounting seat (3) adjacent to the pedal (1), the detachable mounting seat (3) includes a left housing (301) and a right housing (302), an internally-threaded column (311) is provided on an inner wall of the left housing (301), a mounting through hole (201) configured for the internally-threaded column (311) to pass through is provided on the vertical rod (2), and a first countersunk through hole (312) is provided on a top of the right housing (302).

2. The kick scooter having a detachable steering mechanism according to claim 1, wherein a support fork (8) connected to a front wheel (7) is provided on a bottom of the vertical rod (2), the detachable mounting seat (3) is provided on a top of the support fork (8), and a support ring (303) is provided on a bottom of the detachable mounting seat (3).

3. The kick scooter having a detachable steering mechanism according to claim 1, wherein an externally-threaded hollow rod (304) is provided on a top of the detachable mounting seat (3), and the externally-threaded hollow rod (304) includes a left rod (314) provided on a top of the left housing (301) and a right rod (324) provided on a top of the right housing (302).

4. The kick scooter having a detachable steering mechanism according to claim 1, wherein a positioning column (308) is provided at one end of the first countersunk through hole (312) adjacent to the left housing (301), and a positioning hole (318) through which the internally-threaded column (311) is inserted and positioned is provided on the positioning column (308).

5. The kick scooter having a detachable steering mechanism according to claim 4, wherein a first reinforcing rib (321) is provided on the inner wall of the left housing (301), the first reinforcing rib (321) is integrally formed with the internally-threaded column (311), a second reinforcing rib (322) is provided on an inner wall of the right housing (302), and the second reinforcing rib (322) is integrally formed with the positioning hole (318).

6. The kick scooter having a detachable steering mechanism according to claim 1, wherein the rotating connection member includes a steering seat and the steering seat includes a steering seat main body (511), and a first fixed piece (521) provided on a top of the steering seat main body (511); wherein a second fixed piece (531) is provided on a bottom of the steering seat main body (511), and a rotation shaft (541) is provided between the first fixed piece (521) and the second fixed piece (531).

7. The kick scooter having a detachable steering mechanism according to claim 1, wherein the engagement structure has a first mounting groove (601), wherein an upper mounting block (602) and a lower mounting block (603) are respectively provided on a top and a bottom of the first mounting groove (601), a second mounting groove is provided on a bottom of the upper mounting block (602), a third mounting groove (605) is provided on a top of the lower mounting block (603), the steering seat main body (511) is provided in the first mounting groove (601), the first fixed piece (521) is provided in the second mounting groove, and the second fixed piece (531) is provided in the third mounting groove (605).

8. The kick scooter having a detachable steering mechanism according to claim 7, wherein an assembly through hole (401) that passes through a top and a bottom of the rotating seat (4) is provided on a middle part of the rotating seat (4), a bearing is provided in the assembly through hole (401), and a rotation shaft (541) passes through the assembly through hole (401) and is rotatably connected to the bearing.

9. The kick scooter having a detachable steering mechanism according to claim 8, wherein a second countersunk through hole (612) directly facing a top of the assembly through hole (401) is provided on the upper mounting block (602), a third countersunk through hole (613) directly facing a bottom of the assembly through hole (401) is provided on the lower mounting block (603), a threaded through hole that passes through a top and a bottom of the rotation shaft (541) is provided on the rotation shaft (541), an externally-threaded fixed countersunk column (10) is threadedly connected to the threaded through hole, a length of the externally-threaded fixed countersunk column (10) is greater than a depth of the threaded through hole, and a nut adapted to the externally-threaded fixed countersunk column (10) is provided in the third countersunk through hole (613).

10. The kick scooter having a detachable steering mechanism according to claim 5, wherein an arc-shaped positioning groove (12) is correspondingly provided on one end of the first reinforcing rib (321) adjacent to the vertical rod (2) and one end of the second reinforcing rib (322) adjacent to the vertical rod (2).

* * * * *